United States Patent [19]

Bordes

[11] 4,347,921

[45] Sep. 7, 1982

[54] FREEWHEEL OR UNIDIRECTIONAL CLUTCH

[75] Inventor: Alain Bordes, Trappes, France

[73] Assignee: SKF Compagnie d'Applications Mecaniques, Clamart, France

[21] Appl. No.: 153,659

[22] Filed: May 27, 1980

[30] Foreign Application Priority Data

May 28, 1979 [FR] France .................................. 79 13494

[51] Int. Cl.³ .......................................... F16D 41/07
[52] U.S. Cl. .................................. 192/41 A; 192/45.1
[58] Field of Search .......................... 192/41 A, 45.1; 188/82.8

[56] References Cited

U.S. PATENT DOCUMENTS 2,214,602  9/1940  Arnold ........................... 192/45.1 X
2,750,019  6/1956  Ferris ................................... 192/45.1
3,651,908  3/1972  Oldfield ........................ 192/41 A X

FOREIGN PATENT DOCUMENTS 1286844  1/1969  Fed. Rep. of Germany ... 192/41 A
699395  11/1953  United Kingdom ............. 192/41 A Primary Examiner—Rodney H. Bonck
Attorney, Agent, or Firm—Beveridge, DeGrandi & Kline

[57] ABSTRACT

A freewheel of the cam type has a series of jamming cams 1 held by a cage 4 between a shaft 3 and an outer sleeve 2. The cams 1 are held in recesses 5 in the cage, which is a single integral moulding, by an integral spring strip 9 which extends around the outer periphery of the cage 4 and has elastic tabs 10 which project into the recesses 5 and bear against circumferentially extending surfaces 11 on the cams 1. They thus exert a substantially radial force 12 and a reaction on the contact line 13 to produce a torque 8 on the cams. The spring strip 9 is fixed angularly and axially with respect to the cage 4 by lugs 15 on the cage 4 fitting in openings 16 in the strip.

6 Claims, 6 Drawing Figures

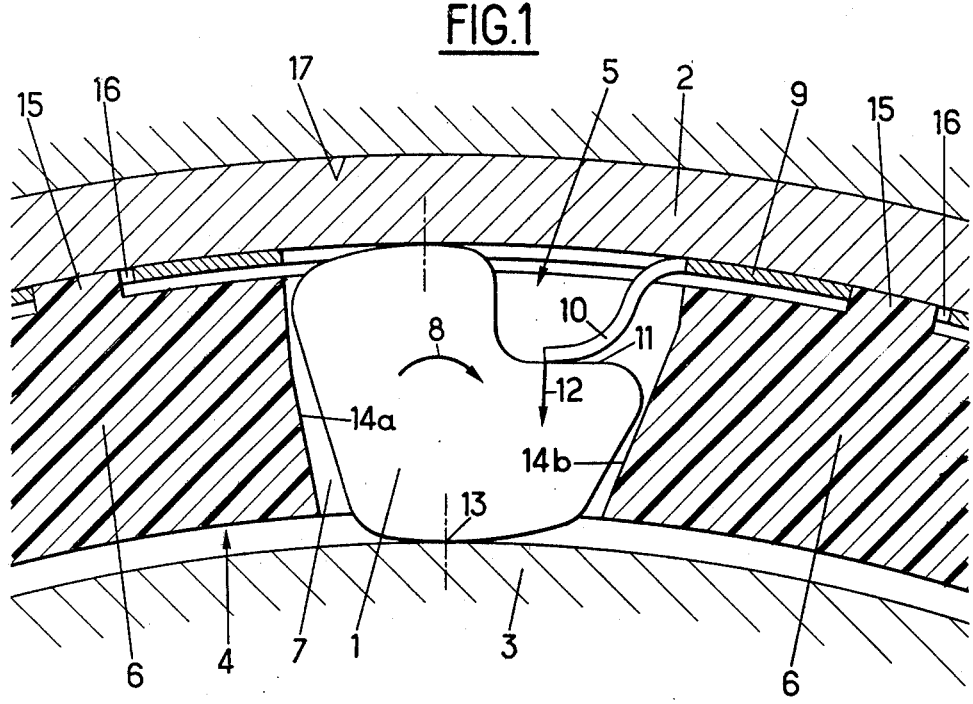
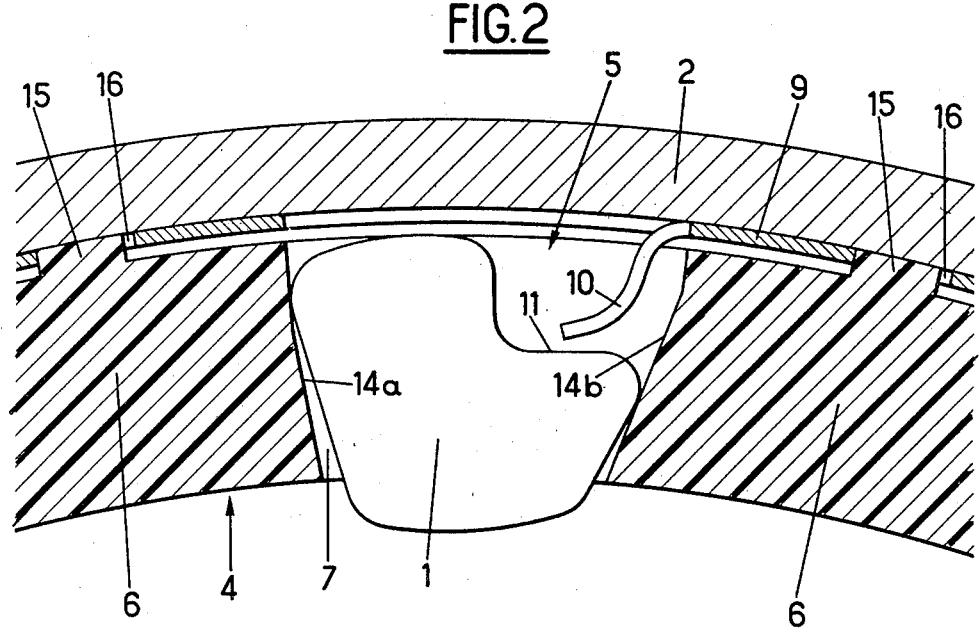

FREEWHEEL OR UNIDIRECTIONAL CLUTCH

This invention relates to freewheels or unidirectional clutches which comprise cam profiled jamming elements which are held in a cage between the inside surface of revolution of an outer ring and the outside surface of revolution of an inner member which is concentric with the outer ring.

Freewheels such as this differ from each other primarily in the nature of the cage which must perform a number of functions. Firstly, it holds the jamming elements at a regular peripheral spacing. Secondly, it holds the elements with their generatrices in the axial direction of the ring and inner member. Thirdly, it exerts individually upon each element a resilient restoring torque, and finally it usually ensures the retention of the elements in the cage during handling of the assembled cage and elements prior to their introduction between the outer ring and inner member. For these purposes the cage comprises a rigid structural member and resilient members which are sometimes united into a single resilient member formed in a continuous strip. However, in order to ensure that all of the preceding functions are carried out two members are generally essential and especially in the case of the resilient member a great complexity of shape and extreme accuracy of dimensions has been necessary. The result of this is that freewheels of the type described above are generally relatively costly and can be employed in practice only for specialized uses and in large sizes.

The aim of the invention is to overcome the foregoing disadvantage of high cost by producing a freewheel, the elements, the case and a single resilient member of which are simple in construction and can be made with wide tolerances in their dimensions.

According to this invention, we provide a freewheel or unidirectional clutch comprising a series of cam profiled jamming elements located between surfaces of revolution in an outer bush and on an inner member and a cage which holds the jamming elements in position, wherein the cage is made as a single integral moulding with recesses containing the elements, side walls of the recesses and adjacent sides of the elements converging inwardly towards the inner member, and an integral spring strip extends around the outer periphery of the cage and has an elastic tab extending into each recess and bearing against a surface of the element which extends in a substantially tangential direction and is located at one side of the element to exert upon the surface a substantially radial thrust which is offset circumferentially from lines of contact between the element and the bush and the inner member, the spring strip being fixed circumferentially and axially with respect to the cage by lugs on the cage or spring strip fitting in openings in the spring strip or the cage respectively.

The tabs of the spring strip exert upon the cam a substantially radial off-centre force which co-operates with the reaction from the inner member to create the necessary preliminary jamming torque, and the tabs hold the elements in position in the cage against outward movement out of the recesses, whilst the retention of the elements towards the inside is ensured by convergence of the walls of the recesses and of the element. The outward retention of the spring strip is in turn ensured by the surrounding outer bush.

The outer bush may consist in a sleeve with inwardly bent edge after the style of the sleeves used with needle bearings for retention of the needles, or as a variant the outer bush may consist of a temporary shipping sleeve which enables the cage to be handled until it is installed in position by axial sliding from this temporary sleeve into a permanent outer bush or ring.

The lugs may be moulded on the outer periphery of the cage in order to co-operate with openings cut out of the spring strip or they may consist of fingers extending from the spring strip and bent inwardly into openings moulded in the cage. In this latter case the ends of the fingers forming the lugs may be bent tangentially and be hooked under portions of the cage to ensure or to contribute to the retention of the spring strip.

Two examples of freewheels or unidirectional clutches in accordance with the invention are illustrated in the accompanying drawings, in which:

FIG. 1 is a section of part of a first example shown in an engaged or driving position;

FIG. 2 is a view corresponding to FIG. 1 but of an assembly of parts of the freewheel or clutch before fitting on a shaft or other inner member;

Figure 3:
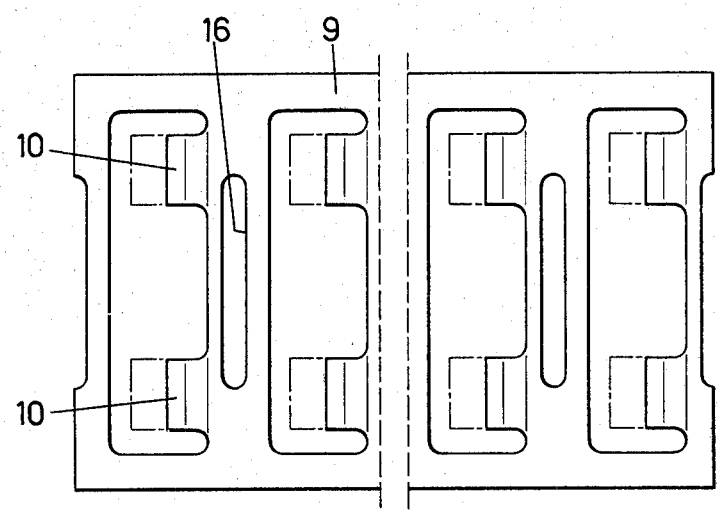
FIG. 3 is a developed plan to a smaller scale of a spring forming part of the first example; and, FIGS. 4, 5 and 6 are views corresponding to FIGS. 1, 2 and 3 but showing a second example.

As may be seen in FIG. 1 the freewheel or clutch comprises in the usual way a number of jamming elements in the form of cams 1 arranged so that they can jam between an outer ring 2 and an inner ring or shaft 3.

A cage 4 for maintaining a regular separation between the cams 1 and maintaining their axial alignment is produced in a single piece of moulded material, preferably filled plastics material, and the cage has recesses 5 of rectangular window shape as viewed radially defining between them successive solid bars 6 joined at their two ends by continuous annular cheeks 7.

In order to ensure the starting of the jamming of the cams 1, that is to say, in order to exert upon each cam 1 a torque in a direction represented by an arrow 8, a single spring 9 is provided which projects into each recess 5 one, or preferably as shown, two flexible tabs 10 each of which acts upon the axial ends of a surface 11 which each cam has at one side. The surface 11 extends in a substantially tangential direction and in a position between inner and outer bearing surfaces of the rings 2 and 3. The tabe 10 exert upon the surface 11 a substantially radial resilient force represented by an arrow 12. The cam 1 makes contact along a generatrix 13 with the shaft 3, which consequently exerts a reaction (not shown) which co-operates with the force represented by the arrow 12 to produce the resilient torque 8 at a time preceding the generation of very much larger jamming forces which are exerted between the cam and the outer ring 2 and the shaft 3 by friction when there is torque between the ring 2 and the shaft 3 in one direction.

As appears in the drawings, side faces 14a and 14b of the recess 5 as well as the opposing side faces of the cam 1 converge in an inward direction towards the shaft 3. This facilitates removal of the cage from the mould and ensures retention of the cams against inward removal. The single spring 9 is produced as a continuous strip in known manner by blanking out, bending and heat treatment followed by cutting to length to fit the freewheel. FIG. 3 shows the detail of the shape of the spring 9, the chain-dotted line indicating the shape as cut out before bending.

It is necessary to ensure the axial and tangential fixing of the spring 9 to the cage 4 and also to ensure the retention of the spring around the periphery of the cage 4 where it is located.

The axial and tangential fixing are effected by lugs 15 which are moulded directly on the periphery of the cage 4 and come in practice, into contact with the inside surface of the outer ring 2. The lugs 15 fit in openings 16 cut out of the spring 9 as shown in FIG. 1. Between the inner periphery of the cage 4 and the inner surface of the outer ring 2 there may be a considerable clearance of nearly twice the thickness of the spring 9. This avoids the necessity for extreme accuracy in manufacture. Since the spring is initially flat, it tends by is resilience to locate itself around the outside of this clearance, that is to say, in contact with the outer ring 2, but it adjusts itself automatically to the inside of this clearance as a function of the tolerances upon the openings 16 and the lugs 15.

In order to ensure the retention of the spring 9 around the cage 4 and also to ensure the retention of the cams 1 in the recess 5 in an outward direction, provision is made as shown in FIG. 2 for delivering the assembly consisting of the cage 4, the spring 9 and the cams 1 inside a thin heat treated steel sleeve having edges extending radially inwards of the type employed with needle bearings for retention of the needles. This sleeve then itself forms the outer ring 2 and in view of its thinness it is itself fitted into a bore 17 in the part in which the freewheel is mounted.

Hence the assembly is supplied in the form shown in FIG. 2, enclosed in its outer sleeve 2 but it will be seen that it is not necessary to provide any inner ring next to the shaft 3 owing to the trapezoidal shape of the openings 5 as seen in an axial direction. This shape ensures the retention of the cams 1 in their openings 5 in an inward direction.

The whole freewheel may be produced very economically since the simple shapes and the low dimensional accuracy demanded of the moulded cage 4 and of the continuous blanked, bent and heat treated spring 9 make them relatively cheap parts. The sleeve 2 is furthermore a standard part which is relatively inexpensive and which makes unnecessary hardening and polishing of the bore 17 to a great hardness and a highly polished state as would otherwise be required.

In a modification, the heat-treated sleeve having retention edges is replaced by a simple tubular sleeve of any kind of material. This is intended solely for ensuring the retention of the cams in assembly during handling before mounting. In this case the bore forming the outer jamming surface is directly machined in a part in which the freewheel is to be mounted and the assembly of the cage, the cams and the spring is transferred into the bore by axial sliding from the temporary shipping sleeve which is then recovered or thrown away.

Figure 6:
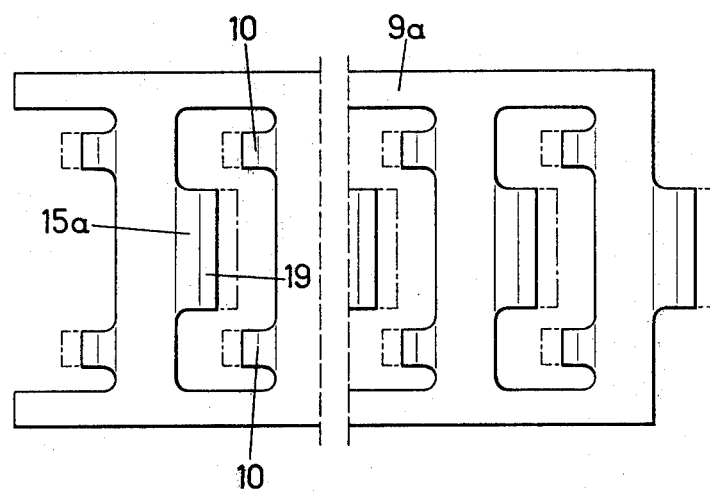
Figure 4:
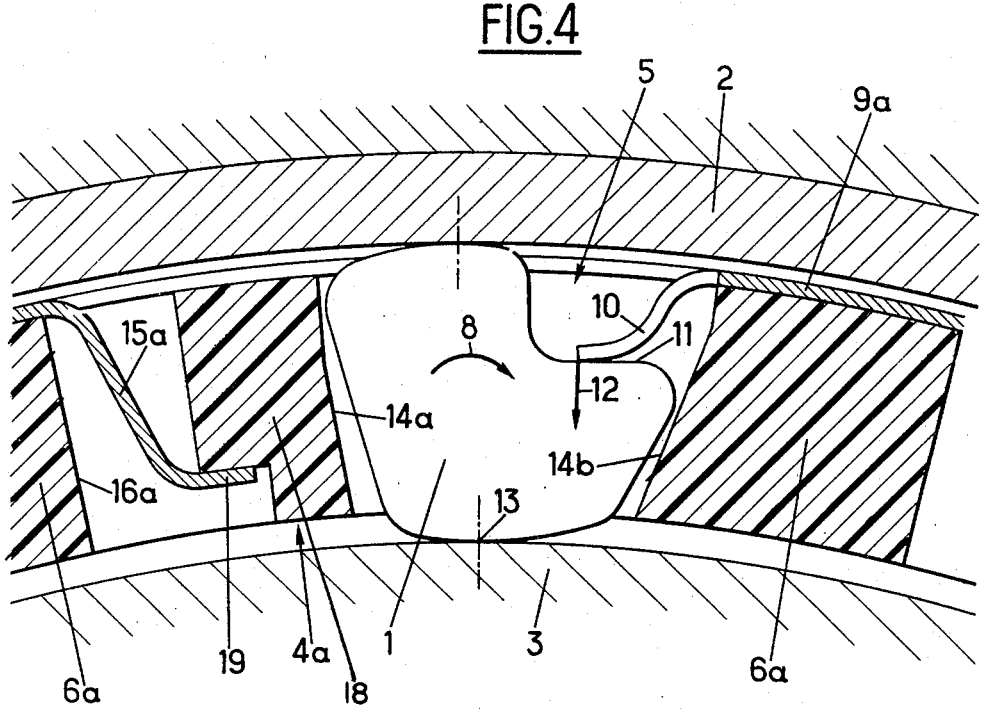
Figure 5:
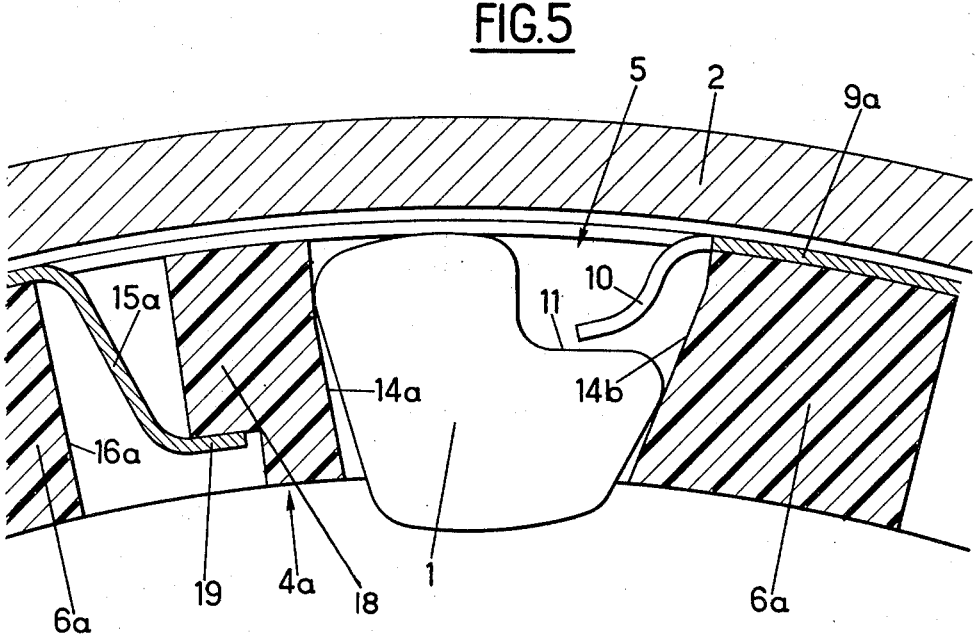

The example of FIGS. 4 to 6 is the same as that just described except that lugs 15a are integral with the spring 9a and openings 16a are formed in the cage 4. The bars 6 of the first example are then divided up into two bars 6a and 18 forming between them the openings 5 and 16a. Each lug 15a may then advantageously be provided with an end 19 bent tangentially in order to hook under the bar 18 which for this purpose is recessed to provide a shoulder at its inner edge. This hooking of the lugs 15a enables retention of the spring around the periphery of the cage 4 to be ensured, so that the outer sleeve 2 no longer has to ensure the retention of the cams 1.

As is the first example, one may employ for the ring 2 a heat-treated sleeve which remains in place, or a temporary shipping sleeve.

I claim:

1. In a unidirectional clutch comprising an outer bush, means defining a surface of revolution within said bush, an inner member, means defining a surface of revolution on said inner member concentric with said surface of revolution on said outer bush, a plurality of cam profiled jamming elements located between said surfaces of revolution and a cage holding said jamming elements, the improvemen wherein said cage comprises a single integral moulding, means defining recesses in said cage, said recesses each containing one of said elements, said recesses having sidewalls converging inwardly towards said inner member and said elements having sides adjacent said converging side walls of said recesses converging inwardly towards said inner member, and an integral spring strip extending around said cage between said cage and said outer bush, said spring strip including a plurality of resilient tabs, one of said tabs extending inwardly into each of said recesses, means defining a surface which extends in a substantially tangential direction on each of said elements, said surface being located at one side of said element and said tab in each of said recesses bearing against said surface on said element in said recess to exert upon said surface a substantially radial thrust which is offset circumferentially from a line of contact between said element and said inner member, and further comprising lugs on one of said cage and said spring strip and means defining openings in one of said spring strip and said cage, said lugs fitting in said openings to locate said spring strip circumferentially and axially with respect to said cage.

2. A clutch as claimed in claim 1, in which said lugs are moulded on the periphery of said cage and said openings are cut out of said spring strip.

3. A clutch as claimed in claim 1, in which said openings are moulded in said cage and said lugs are cut in said spring and are bent inwards into said opening in said cage.

4. A clutch as claimed in claim 3, further comprising a tangentially bent edge on each of said lugs, a portion of said cage between each of said openings and each of said recesses, and means defining a shoulder at the inner edge of said portion, said tangentially bent edges of said lugs being hooked under said portions and being received in said shoulders.

5. A clutch as claimed in claim 1, in which said outer bush is a thin heat-treated steel sleeve.

6. A clutch as claimed in claim 1, in which said outer bush is a temporary cylindrical shipping sleeve, from which, in use, said cage, said elements and said spring strip are axially moveable.

* * * * *